(12) United States Patent
Hwang et al.

(10) Patent No.: US 11,340,846 B2
(45) Date of Patent: May 24, 2022

(54) PERSONALIZED PRINTER LISTS

(71) Applicant: Hewlett-Packard Development Company, L.P., Spring, TX (US)

(72) Inventors: Peter G. Hwang, Vancouver, WA (US); Kris Livingston, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/258,351

(22) PCT Filed: Dec. 12, 2018

(86) PCT No.: PCT/US2018/065153
§ 371 (c)(1),
(2) Date: Jan. 6, 2021

(87) PCT Pub. No.: WO2020/122891
PCT Pub. Date: Jun. 18, 2020

(65) Prior Publication Data
US 2021/0294545 A1 Sep. 23, 2021

(51) Int. Cl.
*G06F 3/12* (2006.01)
(52) U.S. Cl.
CPC .......... *G06F 3/1226* (2013.01); *G06F 3/1204* (2013.01); *G06F 3/1238* (2013.01); *G06F 3/1285* (2013.01)
(58) Field of Classification Search
None
See application file for complete search history.

(56) References Cited

U.S. PATENT DOCUMENTS

| | | | |
|---|---|---|---|
| 8,854,669 B1 * | 10/2014 | Jazayeri | G06F 3/1204 358/1.15 |
| 8,867,070 B2 | 10/2014 | Jazayeri et al. | |
| 8,953,192 B2 | 2/2015 | Gutnik et al. | |
| 9,007,623 B2 | 4/2015 | St. Jacques, Jr. et al. | |
| 9,058,138 B2 | 6/2015 | St. Laurent et al. | |
| 9,122,433 B2 | 9/2015 | Haapanen | |
| 9,817,622 B2 | 11/2017 | Kamath et al. | |
| 2004/0218201 A1 | 11/2004 | Lermant et al. | |
| 2009/0201531 A1 | 8/2009 | Pandit et al. | |

(Continued)

*Primary Examiner* — Thomas D Lee
(74) *Attorney, Agent, or Firm* — Tong Rea Bentley & Kim LLC

(57) ABSTRACT

In example implementations, an apparatus is provided. The apparatus includes a communication interface, a location sensor, a personalized printer list generator, a display, and a processor. The processor is communicatively coupled to the communication interface, the location sensor, the personalized printer list generator, and the display to control operation of the communication interface, the location sensor, the personalized printer list generator, and the display. The communication interface is to communicate with a plurality of printers to identify available printers at a current geographic location. The location sensor is to detect the current geographic location. The personalized printer list generator is to generate a personalized printer list that prioritizes the plurality of printers at the current geographic location based on the user account. The display is to provide a graphical user interface to display the personalized printer list that is generated for the current geographic location.

16 Claims, 5 Drawing Sheets

(56) References Cited

U.S. PATENT DOCUMENTS

| | | | |
|---|---|---|---|
| 2010/0220350 A1* | 9/2010 | Faridi | G06F 3/1205 358/1.15 |
| 2011/0235090 A1 | 9/2011 | Salgado | |
| 2014/0098249 A1* | 4/2014 | Park | H04N 1/32117 348/207.2 |
| 2015/0378646 A1 | 12/2015 | James et al. | |

* cited by examiner

PERSONALIZED PRINTER LISTS

BACKGROUND

Printers may be used to process and print documents. For example, the documents may be sent from a device that is connected to the printer. Devices may connect to printers to send print jobs and print documents over a network connection (e.g., a wired or wireless connection) or through a direct connection to the printer. For example, a driver may be installed on the device to allow the device to connect to a printer and communicate with the printer over the network connection or a direct connection to process print jobs.

DETAILED DESCRIPTION

Examples described herein provide an apparatus and method to provide personalized printer lists on an electronic device. As discussed above, devices may connect to a printer to process a print job and print a document. At some locations, a device may be connected to many printers. When a user selects a document to print on his or her device, a user interface may appear that includes a list of printers that are available. The list may have a fixed order of printers and may include printers that have been installed (e.g., the drivers have been loaded onto the device) on the device, as well as printers discovered on the fly on the local network or via location proximity.

However, the list may include printers that have been installed on the device (e.g., through an add printer process on the device or device drivers) and may not be updated with other printers that are available locally. In other words, even if other printers are available, the other printers may not appear in the list unless they are manually added on the device through the add printer process. In addition, the other printers may appear in a list with device specific names that provide no context as to where the printers are located or how to identify a particular printer.

Examples herein provide an apparatus and method that provide a device agnostic personalized printer list based on location information. For example, the graphical user interface that provides the personalized printer list may be provided regardless of which device is being used. For example, the personalized printer list may be tied to user's credentials (e.g., a corporate log in). Thus, whichever device the user logs into, the personalized printer list may be provided when the user wants to print a document.

In addition, the personalized printer list may be based on user preferences and geographic location. For example, the personalized printer list may vary depending on a geographic location of the device of the user. In addition, the user preferences may allow a user to select a preferred printer to appear at the top of the personalized printer list or a corporate entity may pin a printer to the top of the personalized printer list of all users.

Figure 1:
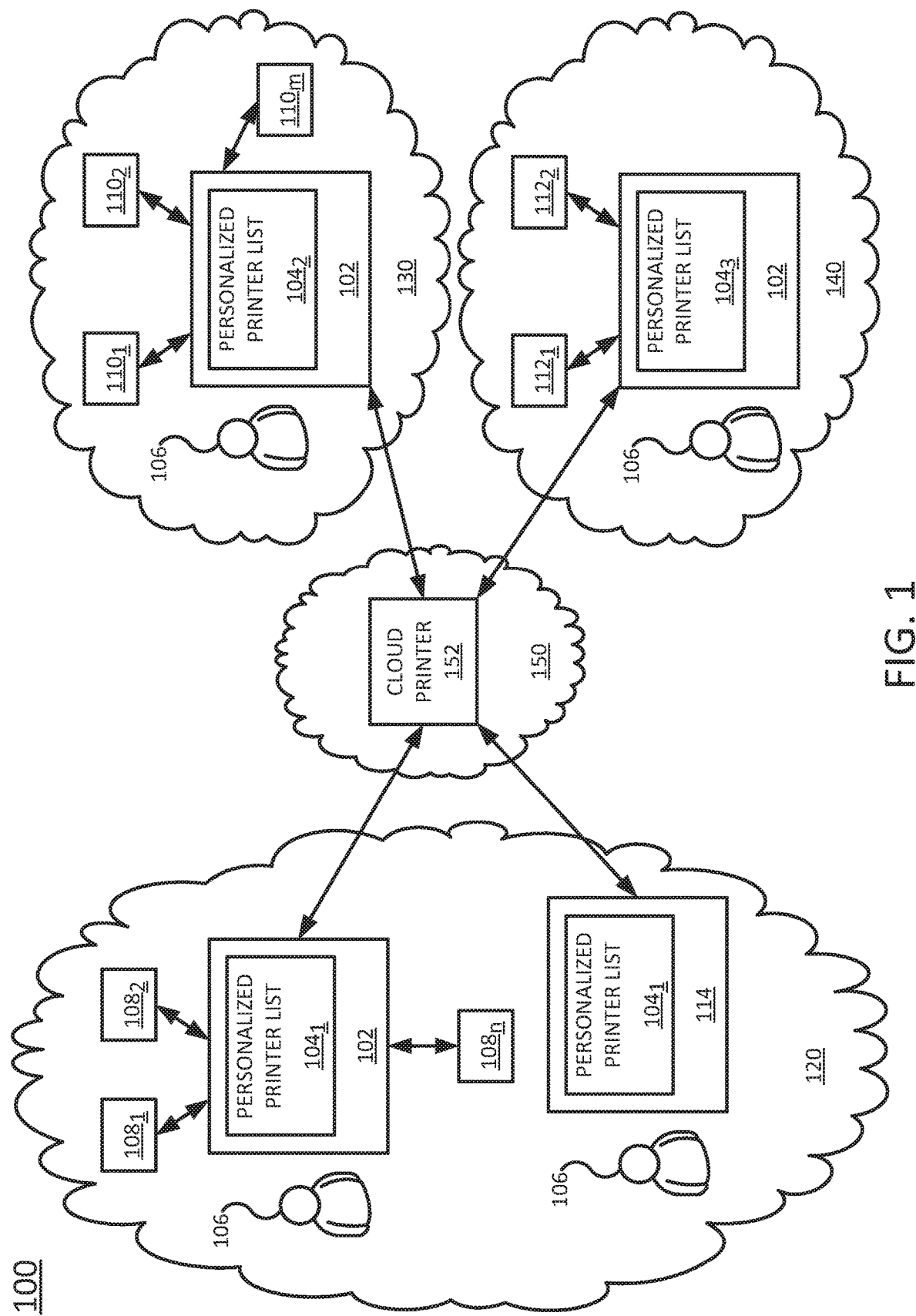
FIG. 1 is a block diagram of an example network of the present disclosure.

FIG. 1 illustrates an example of a network 100 to generate and provide personalized printer lists of the present disclosure. In one example, the network 100 may include a device 102 of a user 106 and a plurality of different locations 120, 130, and 140. In one example, the device 102 may be any type of device such as a desktop computer, a laptop computer, a smart phone, a tablet computer, and the like. In one example, the device 102 may be used to send files to a printer.

In one example, the locations 120, 130, and 140 may be different campuses of an enterprise, different geographic locations, a home of the user 106, and the like. For example, the location 120 may be a company location, the location 130 may be different building of the company at the location, and the location 140 may be a home of the user 106. However, the locations 120, 130, and 140 may be other types of locations, such as an airport, a hotel, a guest office at a vendor site, and so forth.

The user 106 may be at the location 120 with the device 102. The device 102 may include a personalized printer list $104_1$. The personalized printer list $104_1$ may be displayed on the device 102 when the user 106 selects a file to print at one of the printers $108_1$-$108_n$ (also referred to herein individually as a printer 108 or collectively as printers 108) at the location 120.

In one example, the personalized printer list $104_1$ may be based on the location 120 and preferences of the user 106. In one example, the personalized printer list $104_1$ may be prioritized initially based on proximity to the printers 108 at the location 120. For example, based on a location of the user 106 at the location 120, the personalized printer list $104_1$ may prioritize the printers 108 based on a distance to the device 102. In one example, the printer $108_1$ may be closest, the printer $108_2$ may be second closest, and the printer $108_n$ may be the furthest. As a result, the personalized printer list $104_1$ may prioritize the printers in order of $108_1$, $108_2$, and $108_n$.

If the device 102 is a mobile device, as the user 106 and the device 102 move around the location 120, the priority of the printers 108 may be changed. For example, the device 102 may be moved such that the order of proximity of the printers 108 to the device 102 may be listed as $108_2$, $108_n$, and $108_1$.

In one example, the network 100 may include a cloud printer 152 in a location 150. For example, the cloud printer 152 may be an application server or device that provides cloud printing services. For example, the cloud printer 152 may be presented as an option in the personalized printer list $104_1$. In one example, the cloud printer 152 may allow the device 102 to print to any of the printers 108 even if the device 102 is not on a common network with the printers 108.

In one example, the personalized printer list $104_1$ may be customized to allow an enterprise to pin a particular printer 108 or the cloud printer 152 to a top of the list. As a result, regardless of the proximity of the printers 108 to the device 102, a pinned printer selected by a company may be shown as the first printer in the personalized printer list $104_1$. For example, the cloud printer 152 may be pinned by the company, or the printer $108_2$ may be the most efficient and low cost printer in the location 120. Thus, to encourage the user 106 to use the printer $108_2$, the printer $108_2$ may be shown first in the personalized printer list $104_1$ even if other printers $108_1$ and $108_n$ are in closer proximity to the device 102. In some examples, a company may pin multiple printers to the top of the printer list.

In one example, the personalized printer list $104_1$ may be customized with a favorite printer by the user 106. For example, the printer $108_2$ may be the furthest from the device 102. However, the user 106 may prefer walking a distance to the printer $108_2$ to get some daily exercise. Thus, the user 106 may select the printer $108_2$ as a favorite printer and the printer $108_2$ may be shown first, or below the company pinned printer, in the personalized printer list $104_1$. In some examples, the user 106 may select more than one favorite printer and the favorite printers may be shown first in the personalized printer list $104_1$ In one example, the personalized printer list $104_1$ may also prioritize recently used printers over the priority based on proximity to the device 102. For example, the recently used printers may be listed below the company pinned printers and favorite printers, but above the printers prioritized based on geographic location or proximity to the device 102.

In one example, a favorite recently used printer may be selected based on a pull print job to a particular printer. For example, the user 106 may select a document on the device 102 to be "pull" printed. For example, the document may be sent to the cloud printer 152 and then pulled from any of the networked printers 108. The user 106 may walk to the printer $108_1$ and pull the print job from the cloud printer 152. The device 102 may recognize the printer $108_1$ that the document was pulled from and list the printer $108_1$ as a recently used printer of the user 106 in the personalized printer list $104_1$. The printer $108_1$ may be listed at a top of a recently used section of the personalized printer list $104_1$. In one example, the user 106 may select the printer $104_1$ from the recently used section as a favorite printer. The printer $104_1$ may then be listed first in the personalized printer list $104_1$, as described above.

Over time as the user 106 uses different printers 108, the personalized printer list $104_1$ the device 102 may track which printers 108 are used by the user 106. The personalized printer list $104_1$ may gradually change over time from the initial prioritized list based on proximity to the device 102 to a prioritized list based on usage of each printer 108. Thus, over time the device 102 may detect that the device 102 sends print jobs most frequently to $108_1$. Thus, the printer $108_1$ may be shown higher on the personalized printer list $104_1$ than the other printers $108_2$ to $108_g$.

However, the user selected favorite printer may be shown first above the prioritized list of printers 108. For example, the user 106 may still have the printer $108_2$ selected as a favorite printer even though most of the print jobs are sent to the printer $108_1$. Thus, the printer $108_2$ may be shown first before the printer $108_1$, even though the device 102 sends most of the print jobs to the printer $108_1$.

In one example, the personalized printer list $104_1$ may also allow a user to customize the names of the printers 108 in the personalized printer list $104_1$. For example, current printer lists may show a device number, a model name, a serial number, and the like. However, these numbers may not provide any context to the user 106 regarding which printer is which or where the printer is located. When the user 106 learns that the printer $108_1$ is the printer in the hallway, the user 106 may modify the name of the printer $108_1$ in the personalized printer list $104_1$ as "the hallway printer."

In one example, the personalized printer list $104_1$ at the location 120 may be different for different users at the location 120. For example, the personalized printer list $104_1$ for a different user may have a different priority of printers based on the different user's favorite printer, current location within the location 120, and the like. In addition, the different user may have different custom names for the printers 108 and the personalized printer list $104_1$ may show different custom printer names.

At a later time, the user 106 may travel to location 140 (e.g., a home of the user). The location 140 may include two printers $112_1$ and $112_2$. Thus, when the user selects a document to print at the location 140, a personalized printer list $104_3$ may be shown in the display of the device 102. The personalized printer list $104_3$ may be different than the personalized printer list $104_1$ in that it lists different printers 112 based on usage of the printers 112 at the location 140, user preferences, company pinned printers, and the like. However, the personalized printer list $104_3$ may be initialized based on geographic location and generated over time similarly to the personalized printer list $104_1$.

At a later time, the user 106 may travel to the location 130 (e.g., a different campus of the company). The location 130 may have printers $110_1$ to $110_m$ (hereinafter also referred to individually as a printer 110 or collectively as printers 110). At the location 130 when the user selects a document to print the device 102 may show a personalized printer list $104_2$. The personalized printer list $104_2$ may be different than the personalized printer lists $104_1$ and $104_3$ in that the personalized printer list $104_2$ lists different printers 110 based on usage of the printers 110 at the location 130, user preferences, company pinned printers, and the like. However, the personalized printer list $104_2$ may be initialized based on geographic location and generated over time similarly to the personalized printer lists $104_1$ and $104_3$.

At a later time, the user 106 may return to the location 120 and use a different device 114. For example, the device 114 may be in a conference room at the location 120. The user may log into the device 114 with his or her credentials (e.g., a username and password) to be authenticated on the device 114. When the user 106 selects to print a document on the device 114, the same personalized printer list $104_1$ may be displayed on the device 114. For example, the same company pinned printer, favorite printers at the location 120, recently used printers, and the like may be displayed first in the personalized printer list $104_1$ and the custom names for the printers 108 may be shown. The remaining printers 108 at the location 120 may be prioritized based on usage that is tracked over time.

Thus, the personalized printer lists $104_1$-$104_3$ may be for a specific user 106 based on log in credentials on any device 102 or 114. In other words, the personalized printer lists $104_1$-$104_3$ may be device agnostic, but user dependent. Thus, whenever the user 106 logs into a device 102 or 114 and is authenticated at a particular location 120, 130, or 140, the appropriate personalized printer list $104_1$-$104_3$ may be displayed as the user 106 roams from location to location.

In one example, the personalized printer lists $104_1$-$104_3$ may be stored locally on the device 102 or 114. In one example, the personalized printer lists $104_1$-$104_3$ may be stored in a central location, e.g., a database in the central location 150 or the cloud printer 152. When the user 106 logs into the device 102 or 114, the device 102 or 114 may communicate with the cloud printer 152 and obtain the appropriate personalized printer list $104_1$-$104_3$ for the user and based on the location 120, 130, or 140.

Although a particular number of printers 108, 110, and 112 are shown in the respective locations 120, 130, and 140, it should be noted that any number of printers may be deployed at the locations 120, 130, and 140. It should also be noted that the network 100 has been simplified for ease of explanation. For example, the network 100 may include additional network elements that are not shown, such as routers, switches, gateways, firewalls, border elements, sub-networks, access networks, and the like.

Figure 2:
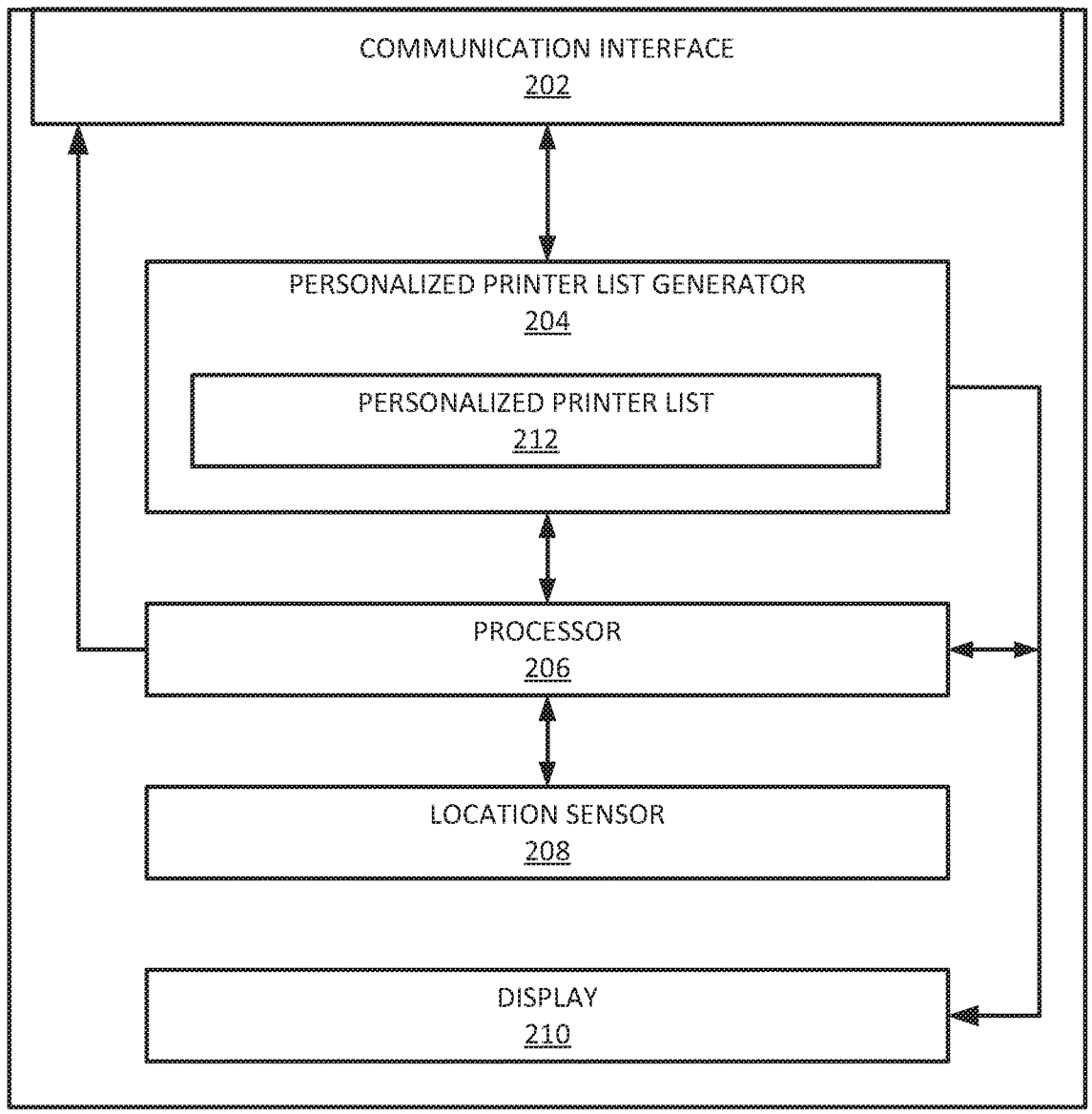
FIG. 2 is a block diagram of an example apparatus for generating a personalized printer list of the present disclosure.

FIG. 2 illustrates an example of the device 102 of the present disclosure. In one example, the device 102 may include a communication interface 202, a personalized printer list generator 204, a processor 206, a location sensor 208, and a display 210. The processor 206 may be communicatively coupled to the communication interface 202, the personalized printer list generator 204, the location sensor 208, and the display 210.

In one example, the communication interface 202 may communicate with a plurality of printers to identify available printers at a current geographic location. For example, when the user 106 logs into the device 102 with user credentials (e.g., a log in and password combination) or initiates a print process on the device 102, the processor 206 may cause the communication interface 202 to send out a signal to ping nearby printers. The communication interface 202 may broadcast the signal via a wired or wireless communication path.

In one example, the nearby printers may respond with printer information, location information, and the like. The location sensor 208 may detect a current geographic location of the device 102. The location sensor 208 may be a global positioning system (GPS) radio that can obtain GPS coordinates or alternative location detection technology such as network triangulation.

In one example, the processor 206 may compare the location information from the available printers to the current geographic location detected by the location sensor 208. The processor 206 may then prioritize the printers based on proximity to the current geographic location of the device 102. The prioritized list of printers may be provided to the personalized printer list generator 204.

In one example, the personalized printer list generator 204 may comprise specific instructions stored in a memory of the device 102 that are executed by the processor 206 to generate a personalized printer list 212. In one example, the personalized printer list generator 204 may determine if there are any company pinned printers, favorite printers selected by the user, recently used printers by the user, and the like. In one example, the information can be obtained from a centralized database or the cloud printer 152 when the user logs into the device 102, as discussed above.

Based on the company pinned printers, favorite printers selected by the user, recently used printers by the user, and prioritized list of printers based on geographic location, the personalized printer list generator 204 may generate the personalized printer list 212. The personalized printer list 212 may be shown in a graphical user interface on the display 210.

In one example, device 102 may include a memory (e.g., a non-transitory computer readable medium). The personalized printer list 212 may be stored in the memory locally on the device 102. In one example, the memory may also store custom names associated with each printer in the personalized printer list 212. As noted above, the user may create custom names for each printer that may provide context for each printer. The context may provide information related to where the printer is located, a type of printer, printer capabilities, and the like, rather than just have a model or serial number of the printer shown in the printer list.

The memory may also store the favorite printer selected by a user, if stored locally. The memory may also store tracked usage of each printer at each location to modify the order of the printers of the personalized printer list 212 over time as the usage of each printer changes.

In one example, the device 114 may be similar to the device 102. For example, the device 114 may also include the communication interface 202, the personalized printer list generator 204, the processor 206, the location sensor 208, the display 210, and be similarly arranged.

Figure 3:
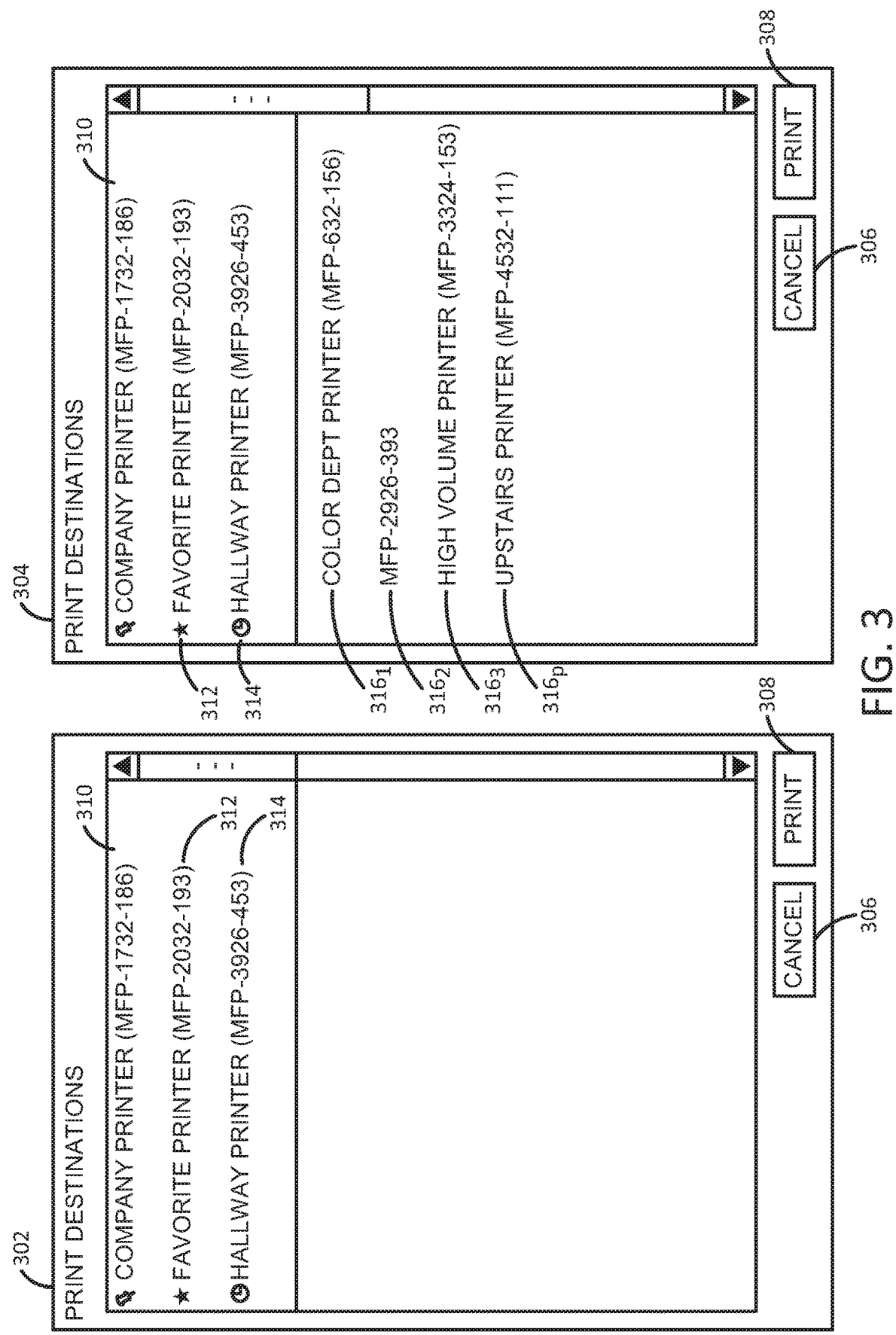
FIG. 3 is a block diagram of example graphical user interfaces that displays the personalized printer list at different geographic locations of the present disclosure.

FIG. 3 illustrates an example graphical user interface (GUI) 302 and 304. The GUI 302 and 304 illustrate examples of the personalized printer lists described above. The GUI 302 and 304 may each include a cancel button 306, a print button 308, and a list of printers from a personalized printer list.

In one example, the GUI 302 may show a company pinned printer 310, a favorite printer 312, and/or a recently used printer 314 immediately. For example, when a user initiates a print request on the device 102, the GUI 302 may be shown in response with the company pinned printer 310, the favorite printer 312, and/or the recently used printer 314.

In other words, the company pinned printer 310, the favorite printer 312, and/or the recently used printer 314 may be shown before the device completes the communication process to detect printers available at a particular location, as described above. The communication process to detect other printers available at the geographic location may take several seconds. As a result, having to wait to see which printers are available until after the communication process is completed may be inefficient and undesirable for a user.

The device 102 may assume that when the device 102 is at a geographic location that the company pinned printer 310, the favorite printer 312, and/or the recently used printer 314 for that geographic location are still available. Thus, the user may immediately select one of those printers without waiting for the remaining available printers to be displayed. As a result, the way the personalized printer list is displayed in the GUI 302 may be more efficient to immediately provide a printer that the user may likely select.

At a later time, the GUI 304 shows how the available printers are eventually populated in the GUI 304. For example, the other printers $316_1$ to $316_p$ that are available at the geographic location are added to the GUI 304 after the communication process to detect available printers is completed.

In one example, if for some reason the company pinned printer 310, the favorite printer 312, and/or the recently used printer 314 is selected and determined to be unavailable, the device 102 may provide an error message on the display 210. For example, the user may select the favorite printer 312 after it is shown immediately. The device 102 may attempt to establish a communication path to the printer 312, but printer 312 may be offline, being serviced, or removed. In response, the device 102 may display an error message and request the user to select a different printer from the GUI 304.

FIG. 3 also illustrates how some of the printers 310, 312, 314, and $316_1$-$316_p$ have custom names. In one example, the model name, serial number, company identification number, and the like may be shown in addition to the custom name selected by the user. In some examples, some printers may be not be custom named by the user (e.g., the printer $316_2$).

Although FIG. 3 illustrates an order of the company pinned printer 310, the favorite printer 312, and the recently used printer 314, it should be noted that the company pinned printer 310, the favorite printer 312, and the recently used printer 314 may be arranged in different orders. For example, the favorite printer 312 may be listed first, then the company pinned printer 310, or the recently used printer 314 may be listed first, and so forth. Also, although a single company pinned printer 310, a single favorite printer 312, and a single recently used printer 314 are shown, any number of company pinned printers, favorite printers, and recently used printers can be shown. In one example, the recently used printers may be selected within a predetermined time frame (e.g., recently used within the last day, last week, last month, and the like).

Thus, the network 100 and devices 102 and 114 may provide a personalized printer list. The personalized printer list may be different for each location and be based on user preferences and/or tracked usage at each location. The personalized printer list may be device agnostic and be tied to the credentials of the user when the user logs into a device. The personalized printer list may be different for different users at the same location with the same available printers. In other words, the order in which printers are displayed or prioritized for a first user may be different than the way in which printers are displayed or prioritized for a second user that is at a same location with the same available printers as the first user.

Figure 4:
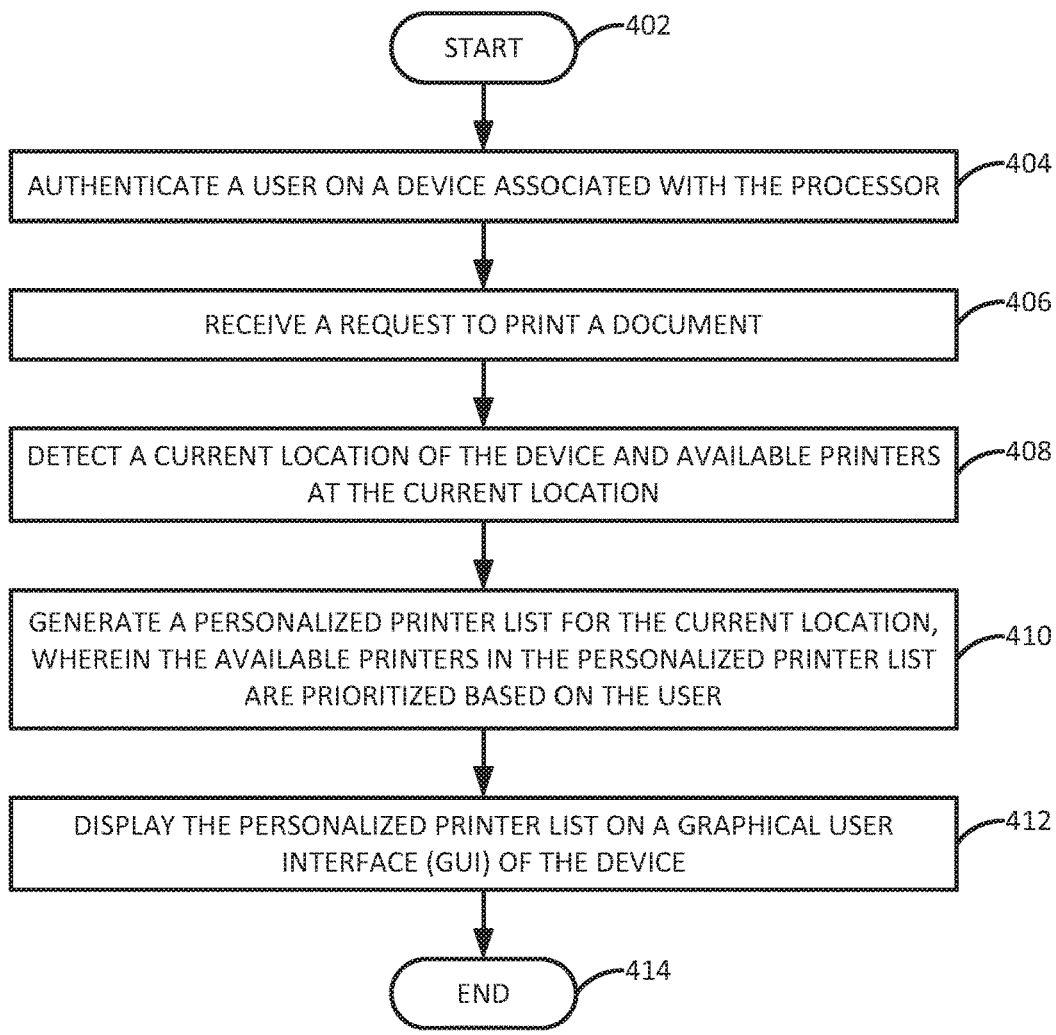
FIG. 4 is a flow chart of an example method for generating a personalized printer list of the present disclosure.

FIG. 4 illustrates a flow diagram of an example method 400 for generating a personalized printer list of the present disclosure. In an example, the method 400 may be performed by the device 102, or the apparatus 500 illustrated in FIG. 5, and described below.

At block 402, the method 400 begins. At block 404, the method 400 authenticates a user on a device associated with the processor. For example, the user may log into the device with a username and password or any other type of authentication credentials.

At block 406, the method 400 receives a request to print a document. For example, the user may select a document to print on a device. In response to the request to print, the device may initiate a communications protocol to detect available printers. The communications protocol may be a signal that is broadcast that requests available printers to reply with printer information (e.g., identification information, geographic location, capability information, and the like).

The signal may be a wireless signal or may be a wired signal. For the wireless signal, the printers within the broadcast range of the signal may be considered to be "nearby" or within proximity of the device. For the wired signal, the signal may be sent out to known Ethernet ports at the location. Printers that are connected to an Ethernet port may receive the signal and respond with the requested information.

At block 408, the method 400 detects a current location of the device and available printers at the current location. In one example, a location sensor on the device may detect a current location of the device (e.g., GPS coordinates). The available printers may be detected based on responses collected from the communication protocol initiated in response to the request to print the document.

At block 410, the method 400 generates a personalized printer list for the current location, wherein the available printers in the personalized printer list are prioritized based on the user. In one example, the personalized printer list may be prioritized based on a user selected favorite printer, a printer recently used by the user, and usage history that is tracked for the available printers. In one example, the user selected favorite printer may be listed first. The printer recently used by the user may be listed below the user selected favorite printer. The remaining available printers may be listed in an order of tracked usage. In the event of a tie, the printers may be listed based on geographic location or proximity to the device.

In one example, a company may pin a printer to the top of the list. The company want a particular printer to be used by everyone. The printer may be efficient and have the lowest cost per page for printing. Thus, the company pinned printer may be listed first above the other printers of the personalized printer list.

At block 412, the method 400 displays the personalized printer list on a graphical user interface (GUI) of the device. In one example, the user selected favorite printer, the printer recently used, and/or the company pinned printer may be stored in local memory. As a result, in response to the request to print a document the GUI may be displayed with the user selected favorite printer, the printer recently used, and/or the company pinned printer. Thus, a user may not have to wait for the communication protocol to detect available printers to be completed.

As the communications protocol is completed, the available printers that are detected may be populated into the GUI below the user selected favorite printer, the printer recently used, and/or the company pinned printer. The order of the available printers may be shuffled in real time based on tracked usage as they are detected by the communications protocol and populated into the GUI. At block 414, the method 400 ends.

Figure 5:
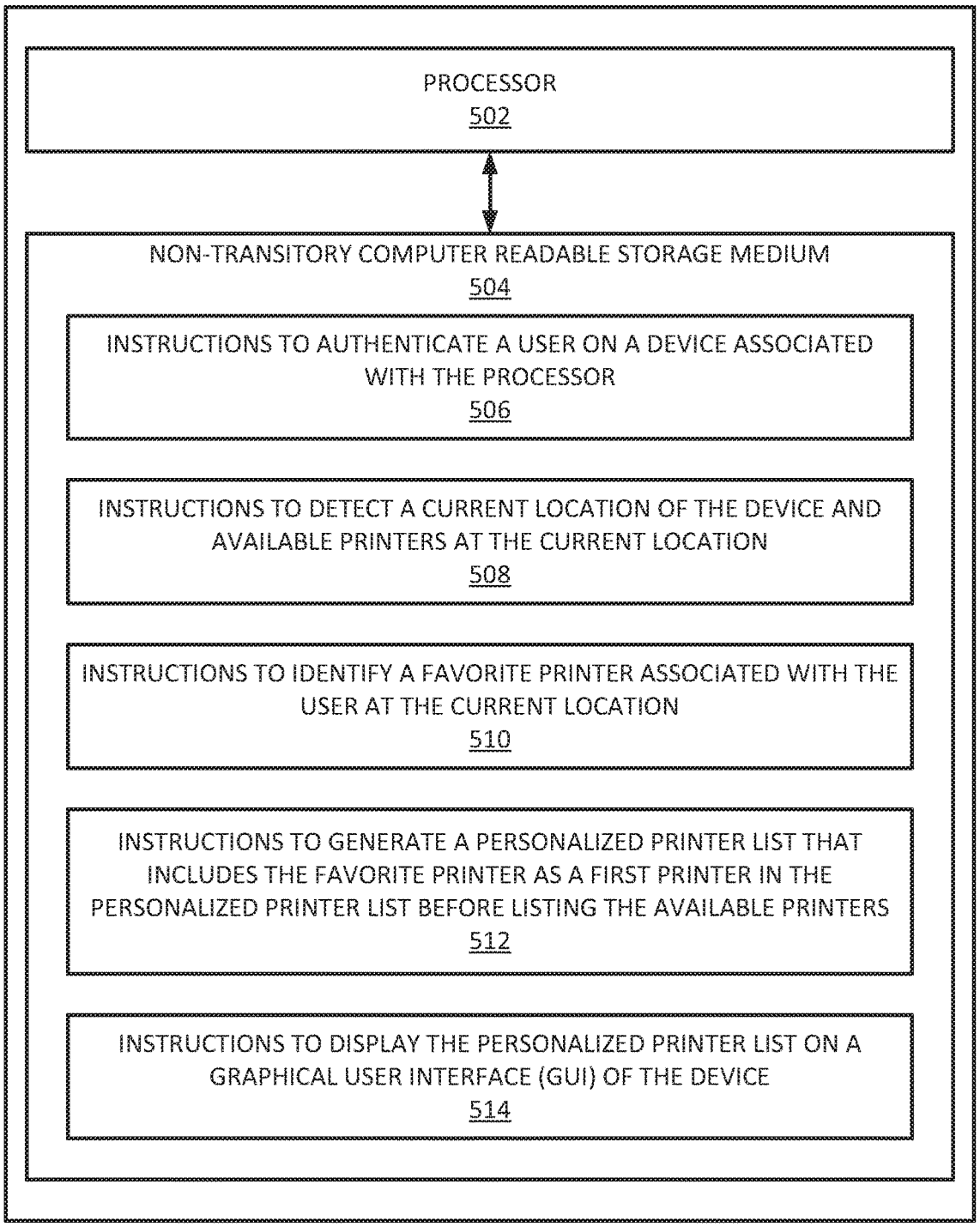
FIG. 5 is a block diagram of an example non-transitory computer readable storage medium storing instructions executed by a processor to generate a personalized printer list.

FIG. 5 illustrates an example of an apparatus 500. In an example, the apparatus 500 may be the device 102. In an example, the apparatus 500 may include a processor 502 and a non-transitory computer readable storage medium 504. The non-transitory computer readable storage medium 504 may include instructions 506, 508, 510, 512, and 514 that, when executed by the processor 502, cause the processor 502 to perform various functions.

In an example, the instructions 506 may include instructions to authenticate a user on a device associated with the processor. The instructions 508 may include instructions to detect a current location of the device and available printers at the current location. The instructions 510 may include instructions to identify a favorite printer associated with the user at the current location. The instructions 512 may include instructions to generate a personalized printer list that includes the favorite printer as a first printer in the personalized printer list before listing the available printers. The instructions 514 may include instructions to display the personalized printer list on a graphical user interface (GUI) of the device.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a communication interface to communicate with a plurality of printers to identify available printers at a current geographic location;
   a location sensor to detect the current geographic location;

a personalized printer list generator to generate a personalized printer list that prioritizes the plurality of printers at the current geographic location based on a user account, wherein the personalized printer list includes a pinned enterprise selected printer, a user selected favorite printer, and a prioritized list based on tracked usage;

a display to provide a graphical user interface (GUI) to display the personalized printer list that is generated for the current geographic location; and a processor communicatively coupled to the communication interface, the location sensor, the personalized printer list generator, and the display to control operation of the communication interface, the location sensor, the personalized printer list generator, and the display.

2. The apparatus of claim 1, further comprising:
a non-transitory computer readable medium is to store custom names associated with each printer in the personalize printer list.

3. The apparatus of claim 2, wherein the non-transitory computer readable medium is to store the user selected favorite printer that is provided in the personalized list in the GUI before the available printers that are identified.

4. The apparatus of claim 2, wherein the non-transitory computer readable medium is to store the enterprise selected printer that is provided at a top of the personalized list in the GUI.

5. The apparatus of claim 1, wherein the processor activates the communication interface in response to receiving credentials associated with the user account and a print request.

6. The apparatus of claim 1, wherein the pinned enterprise selected printer is a first printer listed, the user selected favorite printer is listed after the pinned enterprise selected printer, and the prioritized list based on tracked usage is listed after the user selected favorite printer.

7. A method comprising:
authenticating, by a processor, a user on a device associated with the processor;
receiving, by the processor, a request to print a document;
detecting, by the processor, a current location of the device and available printers at the current location;
generating, by the processor, a personalized printer list for the current location, wherein the available printers in the personalized printer list are prioritized based on the user, wherein the personalized printer list includes a pinned enterprise selected printer, a favorite printer selected by a user, and a prioritized list based on tracked usage; and
displaying, by the processor, the personalized printer list on a graphical user interface (GUI) of the device.

8. The method of claim 7, further comprising:
determining, by the processor, the favorite printer selected by the user for the current location, wherein the favorite printer is listed below the pinned enterprise selected printer in the personalized printer list.

9. The method of claim 8, wherein the favorite printer is selected based on a previous retrieval of a pull print job at a printer.

10. The method of claim 7, further comprising:
storing, by the processor, the favorite printer selected by the user for the current location in a local memory, wherein the favorite printer is shown in the personalized printer list in the GUI while the available printers in the current location to be populated in the GUI are detected and listed below the favorite printer.

11. The method of claim 7, wherein the prioritized list based on tracked usage is prioritized based on a tracked historical usage of the available printers by the user.

12. The method of claim 7, wherein the personalized printer list changes over time from an initial personalized printer list that is based on proximity of the available printers to a prioritized list based on usage of the available printers.

13. A non-transitory computer readable storage medium encoded with instructions executable by a processor, the non-transitory computer-readable storage medium comprising:
instructions to authenticate a user on a device associated with the processor;
instructions to detect a current location of the device and available printers at the current location;
instructions to identify a favorite printer associated with the user at the current location;
instructions to generate a personalized printer list that includes a pinned enterprise selected printer as a first printer in the personalized list, the favorite printer as a second printer in the personalized printer list, and a prioritized list based on tracked usage before listing the available printers; and
instructions to display the personalized printer list on a graphical user interface (GUI) of the device.

14. The non-transitory computer readable storage medium of claim 13, further comprising:
instructions to detect a change in the current location of the device and different available printers at a new location;
instructions to identify a different favorite printer associated with the user at the new location; and
instructions to generate the personalized printer list that includes the different favorite printer in the personalized printer list.

15. The non-transitory computer readable storage medium of claim 13, further comprising:
instructions to detect authentication of the user on a different device at a new location;
instructions to detect different available printers at the new location;
instructions to identify a different favorite printer associated with the user at the new location; and
instructions to generate the personalized printer list that includes the different favorite printer in the personalized printer list on a graphical user interface of the different device.

16. The non-transitory computer readable storage medium of claim 13, wherein the favorite printer associated with the user comprises a different favorite printer at different locations.

* * * * *